United States Patent
Sullivan et al.

(10) Patent No.: US 12,501,073 B2
(45) Date of Patent: Dec. 16, 2025

(54) CONSTRAINTS AND UNIT TYPES TO SIMPLIFY VIDEO RANDOM ACCESS

(71) Applicant: Microsoft Technology Licensing, LLC, Redmond, WA (US)

(72) Inventors: Gary J. Sullivan, Bellevue, WA (US); Sandeep Kanumuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/790,858

(22) Filed: Jul. 31, 2024

(65) Prior Publication Data

US 2024/0397100 A1    Nov. 28, 2024

Related U.S. Application Data

(60) Continuation of application No. 18/443,492, filed on Feb. 16, 2024, which is a continuation of application No. 17/689,235, filed on Mar. 8, 2022, now Pat. No. 11,943,480, which is a continuation of application No. 16/588,992, filed on Sep. 30, 2019, now Pat. No. 11,303,933, which is a continuation of application No. 15/380,961, filed on Dec. 15, 2016, now Pat. No. 10,432,973, which is a division of application No. 13/732,328, filed on Dec. 31, 2012, now Pat. No. 9,532,055.

(60) Provisional application No. 61/667,357, filed on Jul. 2, 2012, provisional application No. 61/639,663, filed on (Continued)

(51) Int. Cl.
| | |
|---|---|
| H04N 19/65 | (2014.01) |
| H04N 19/15 | (2014.01) |
| H04N 19/573 | (2014.01) |
| H04N 19/70 | (2014.01) |
| H04N 19/88 | (2014.01) |
| H04N 19/172 | (2014.01) |
| H04N 19/184 | (2014.01) |

(52) U.S. Cl.
CPC ............ *H04N 19/65* (2014.11); *H04N 19/15* (2014.11); *H04N 19/573* (2014.11); *H04N 19/70* (2014.11); *H04N 19/88* (2014.11); *H04N 19/172* (2014.11); *H04N 19/184* (2014.11)

(58) Field of Classification Search
CPC ....................................... H04N 19/65
USPC .................................... 375/240.26
See application file for complete search history.

(56) References Cited

U.S. PATENT DOCUMENTS

| | | | |
|---|---|---|---|
| 2012/0230401 A1* | 9/2012 | Chen | H04N 21/8455 375/240.12 |
| 2013/0107953 A1* | 5/2013 | Chen | H04N 19/423 375/E7.243 |
| 2013/0235152 A1* | 9/2013 | Hannuksela | H04N 19/114 348/43 |

OTHER PUBLICATIONS

Notice of Allowance dated Jul. 4, 2018, from Chinese Patent Application No. 201380031429.0, 2 pp.

(Continued)

*Primary Examiner* — Yulin Sun
(74) *Attorney, Agent, or Firm* — Klarquist Sparkman, LLP

(57) ABSTRACT

Disclosed herein are innovations for bitstreams having clean random access (CRA) pictures and/or other types of random access point (RAP) pictures. New type definitions and strategic constraints on types of RAP pictures can simplify mapping of units of elementary video stream data to a container format. Such innovations can help improve the ability for video coding systems to more flexibly perform (Continued)

software 180 implementing one or more innovations for encoding or decoding RAP pictures with unit types and/or strategic constraints that simplify mapping to a media container format adaptive video delivery, production editing, commercial insertion, and the like.

20 Claims, 14 Drawing Sheets

Related U.S. Application Data on Apr. 27, 2012, provisional application No. 61/624,984, filed on Apr. 16, 2012.

(56) References Cited

OTHER PUBLICATIONS

Notice of Allowance dated Jun. 12, 2025, from U.S. Appl. No. 18/443,492, 9 pp.
Office action dated Feb. 7, 2017, from Japanese Patent Application No. 2015-507123, 6 pp.
Summons to Attend Oral Proceedings dated Jul. 5, 2017, from European Patent Application No. 13720182.8, 8 pp.
Notice of Allowance dated Aug. 20, 2025, from U.S. Appl. No. 18/790,491, 10 pp.
Notice of Allowance dated Aug. 22, 2025, from U.S. Appl. No. 18/790,561, 11 pp.
Notice of Allowance dated Sep. 3, 2025, from U.S. Appl. No. 18/790,757, 10 pp.
Notice of Allowance dated Sep. 3, 2025, from U.S. Appl. No. 18/790,812, 10 pp.
Notice of Allowance dated Sep. 23, 2025, from U.S. Appl. No. 18/791,066, 11 pp.
Notice of Allowance dated Sep. 24, 2025, from U.S. Appl. No. 18/790,907, 10 pp.
Notice of Allowance dated Sep. 24, 2025, from U.S. Appl. No. 18/791,090, 11 pp.
Notice of Allowance dated Oct. 15, 2025, from U.S. Appl. No. 18/791,122, 11 pp.
Notice of Allowance dated Oct. 15, 2025, from U.S. Appl. No. 18/791,145, 11 pp.

* cited by examiner software 180 implementing one or more innovations for encoding or decoding RAP pictures with unit types and/or strategic constraints that simplify mapping to a media container format

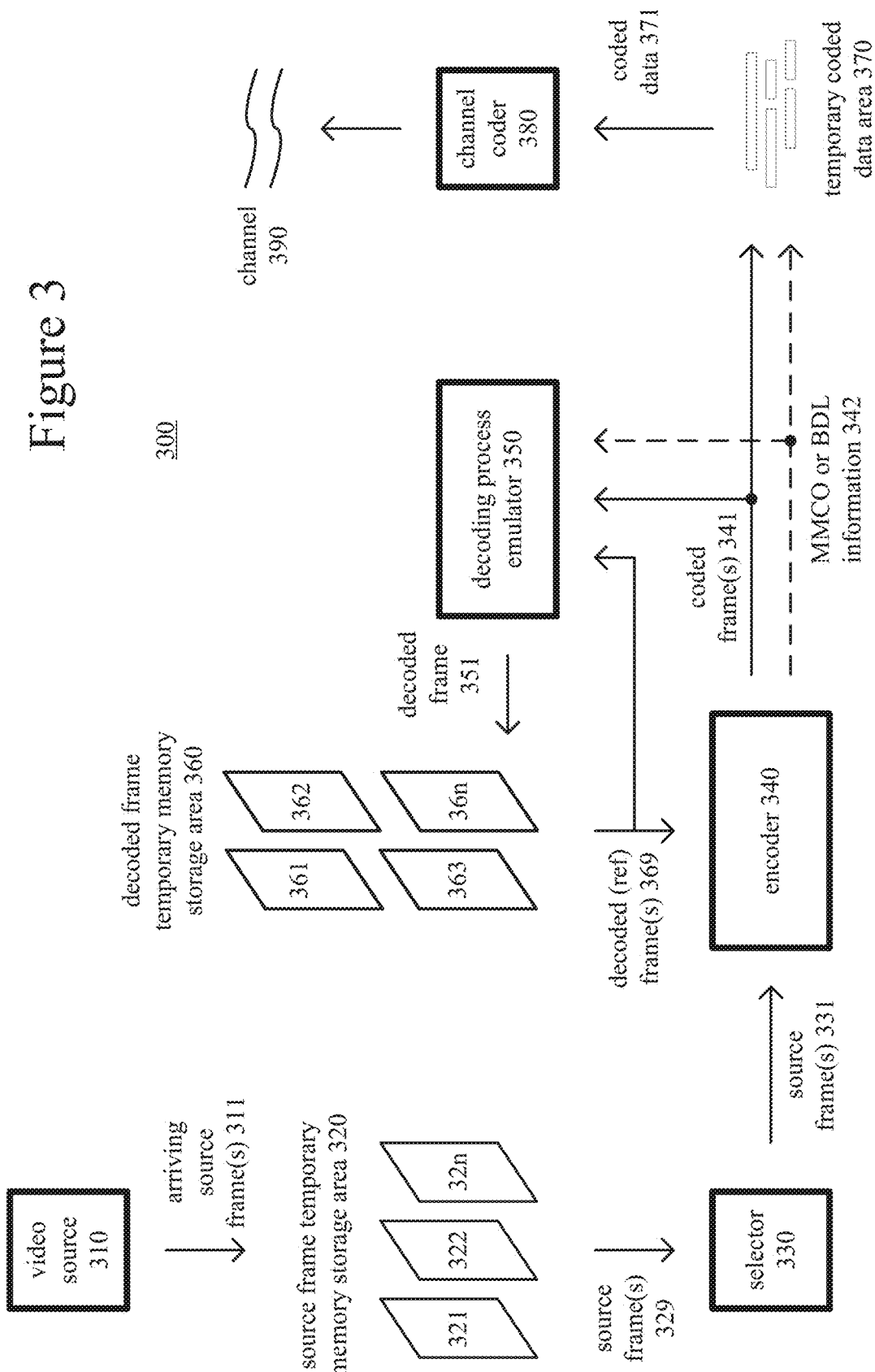

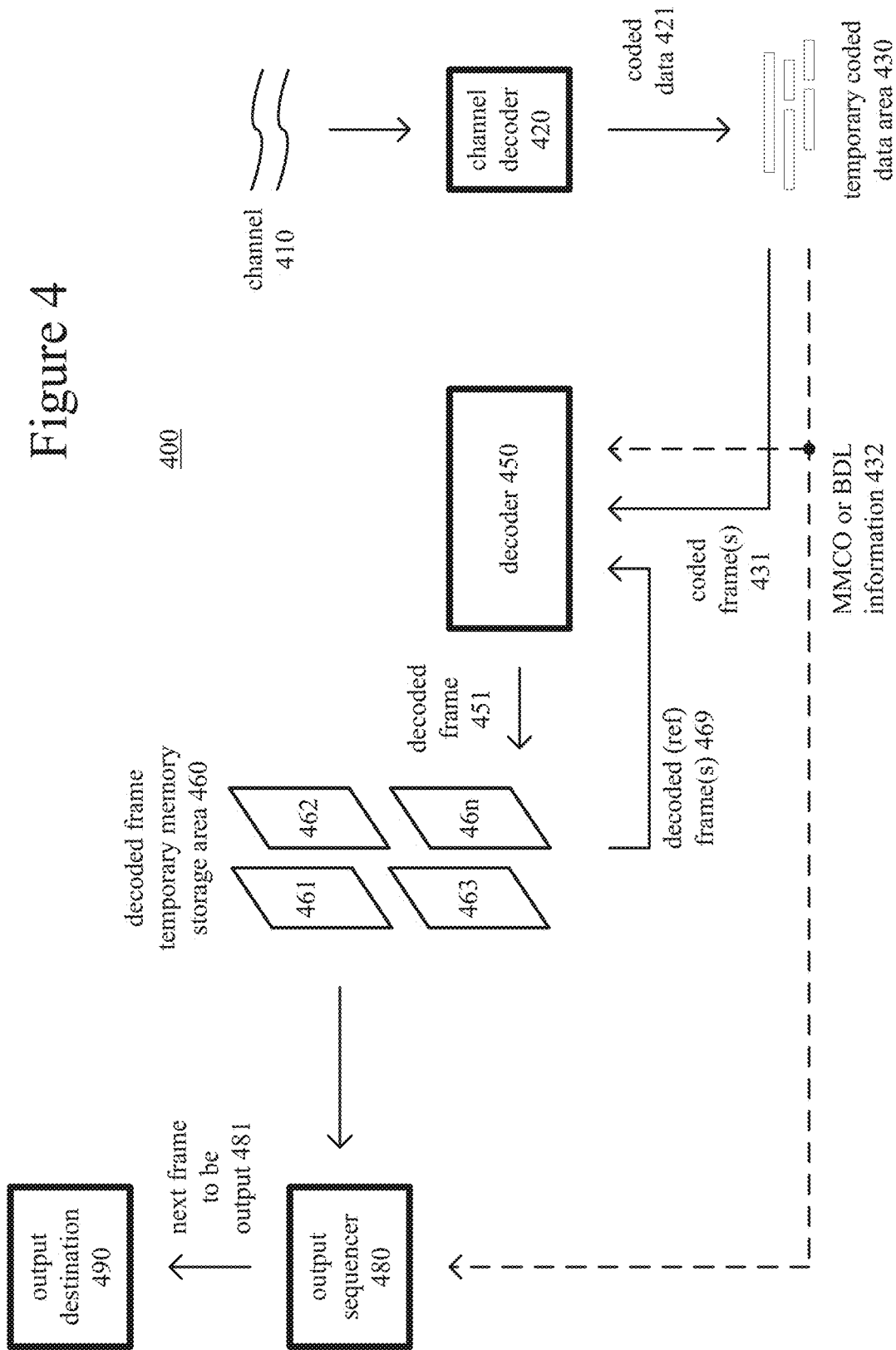

1500

1510 — Receive a bitstream that includes an encoded broken link access picture and one or more encoded associated leading pictures, the bitstream further comprising indications of whether the leading pictures are decodable or not 1512 — Decode the encoded broken link access picture and the one or more encoded associated leading pictures in accordance to the indications

Figure 15

CONSTRAINTS AND UNIT TYPES TO SIMPLIFY VIDEO RANDOM ACCESS

CROSS-REFERENCE TO RELATED APPLICATIONS

This application is a continuation of U.S. patent application Ser. No. 18/443,492, filed Feb. 16, 2024, which is a continuation of U.S. patent application Ser. No. 17/689,235, filed Mar. 8, 2022, now U.S. Pat. No. 11,943,480, which is a continuation of U.S. patent application Ser. No. 16/588,992, filed Sep. 30, 2019, now U.S. Pat. No. 11,303,933, which is a continuation of U.S. patent application Ser. No. 15/380,961, filed Dec. 15, 2016, now U.S. Pat. No. 10,432,973, which is a divisional of U.S. patent application Ser. No. 13/732,328, filed Dec. 31, 2012, now U.S. Pat. No. 9,532,055, which is hereby incorporated by reference. U.S. patent application Ser. No. 13/732,328 claims the benefit of U.S. Provisional Pat. App. No. 61/667,357, filed Jul. 2, 2012, which is hereby incorporated by reference. U.S. patent application Ser. No. 13/732,328 also claims the benefit of U.S. Provisional Pat. App. No. 61/639,663, filed Apr. 27, 2012, which is hereby incorporated by reference. U.S. patent application Ser. No. 13/732,328 also claims the benefit of U.S. Provisional Pat. App. No. 61/624,984, filed Apr. 16, 2012, which is hereby incorporated by reference.

FIELD

This application relates to video encoding and decoding, and specifically to improvements related to random access point pictures.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. More recently, the HEVC standard is under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

In broadcasting and streaming applications, the ability for a decoder to randomly access a point in an encoded bitstream and decode pictures from the random access point is a desirable feature. Such random accessing occurs, for example, when a viewer is switching between broadcasts or streams, or when bitstream splicing is performed.

SUMMARY

In summary, the detailed description presents innovations for bitstreams having clean random access (CRA) pictures and/or other types of random access point (RAP) pictures. New type definitions and strategic constraints on types of RAP pictures can simplify mapping of units of elementary video stream data to a container format. Such innovations can help improve the ability for video coding systems to more flexibly perform adaptive video delivery, production editing, commercial insertion, and the like.

Innovations described herein include, but are not limited to, allowing CRA pictures in the middle of a bitstream, and not just at the beginning of a bitstream, to have one or more potentially non-decodable pictures that appear after a CRA picture in the bitstream. In some uses, these potentially non-decodable pictures are leading pictures relative to the CRA picture in the sense that although they appear after the CRA picture in the bitstream, they have an identified display output order that precedes that of the CRA picture. In other words, in addition to allowing a CRA picture at the beginning of the bitstream to have non-decodable leading pictures, the bitstream is also allowed to have a CRA picture that is not at the beginning of the bitstream and that has potentially non-decodable pictures that follow it in the bitstream. In this context, a leading picture is a picture that follows a CRA picture in bitstream order (also called coded order, decode order, decoding order, etc.) but precedes the CRA picture in display order (also called output order). A CRA picture that begins a bitstream is allowed to be followed (in bitstream order) by leading pictures that cannot be decoded due to missing prior reference pictures. Now, a CRA picture that falls in the middle of a bitstream is also allowed to be followed in the bitstream by such non-decodable pictures. According to embodiments of the disclosed technology, constraints on the presence of non-decodable leading pictures after a mid-bitstream CRA picture have been removed.

In certain example implementations, a flag or other indicator is added (e.g., as picture-level information, in a slice header, etc.) that indicates the potential presence of such non-decodable leading pictures for a CRA picture. The indicator can be used to (e.g., by the decoder) to determine how to handle the leading pictures (e.g., whether the decoder should decode the leading pictures). For example, when the broken link functionality that is described herein is used, different network abstraction layer (NAL) unit types are used to indicate whether and what types of leading pictures are present. Further, these NAL unit types are different than the regular NAL unit type for a CRA. Also, in certain example implementations, a flag or other indicator is added (e.g., as a syntax element at picture-level for a potentially non-decodable picture, as a NAL unit type signaled for a potentially non-decodable picture, etc.) to identify the potentially non-decodable pictures explicitly, rather than using the classification of pictures as leading pictures as the rule that identifies the potentially non-decodable pictures.

Other innovations described herein include, but are not limited to, (a) new definitions of unit types for RAP pictures that simplify mapping of units of video elementary stream data to a container format, (b) strategic constraints on RAP pictures that simplify such mapping operations, and (c) removal of redundant unit types.

Embodiments of the new CRA picture types introduced herein and their associated flags or other indicators are sometimes referred to as "broken link access" (BLA) pictures. The use of such BLA pictures and their associated indicators can increase the number of access points from which a decoder can begin decoding, thereby improving the speed and seamlessness with which video coding systems can perform a wide variety of operations—such as fast forward operations, rewind operations, scanning operations, splicing operations, or switching operations between video streams. Additionally, the use of such BLA pictures and their associated indicators can allow video encoding or video decoding systems to more flexibly perform adaptive video delivery, production editing, commercial insertion, and the like.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIG. 15 is a flow chart showing a fourth exemplary method for decoding a bitstream.

DETAILED DESCRIPTION

The detailed description presents innovations for encoding and decoding bitstreams having clean random access (CRA) pictures and other random access point (RAP) pictures. In particular, the detailed description describes embodiments in which a bitstream is allowed to have a CRA picture at the beginning of a bitstream and is also allowed to have a CRA picture that is not at the beginning of the bitstream, where any of such CRA pictures is allowed to have one or more non-decodable leading pictures. Such CRA pictures are sometimes referred to herein as "broken link access" (BLA) pictures. The detailed description further describes embodiments in which new definitions of unit types for RAP pictures, and strategic constraints on RAP pictures, simplify mapping of units of video elementary stream data to a container format, and redundant unit types are eliminated.

Some of the innovations described herein are illustrated with reference to syntax elements and operations specific to the HEVC standard. For example, reference is made to certain draft versions of the HEVC standard, including JCTVC-11003 of the HEVC standard—"High efficiency video coding (HEVC) text specification draft 7", JCTVC-11003_d5, $9^{th}$ meeting, Geneva, April 2012 (hereinafter "JCTVC-11003_d5"). The innovations described herein can also be implemented for other standards or formats.

More generally, various alternatives to the examples described herein are possible. For example, any of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

Figure 1:
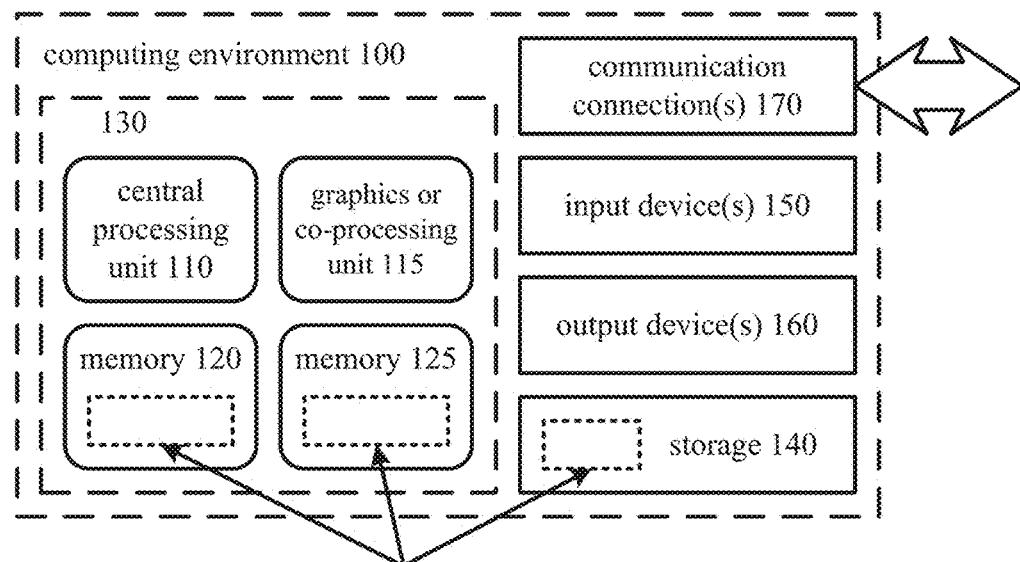
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoding or decoding RAP pictures with unit types and/or strategic constraints that simplify mapping to a media container format (see Sections V, VI, and VII), in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180)

implementing one or more innovations for encoding or decoding RAP pictures with unit types and/or strategic constraints that simplify mapping to a media container format (see Sections V, VI, and VII).

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an application specific integrated circuit (ASIC) (such as an ASIC digital signal process unit (DSP), a graphics processing unit (GPU), or a programmable logic device (PLD), such as a field programmable gate array (FPGA)) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
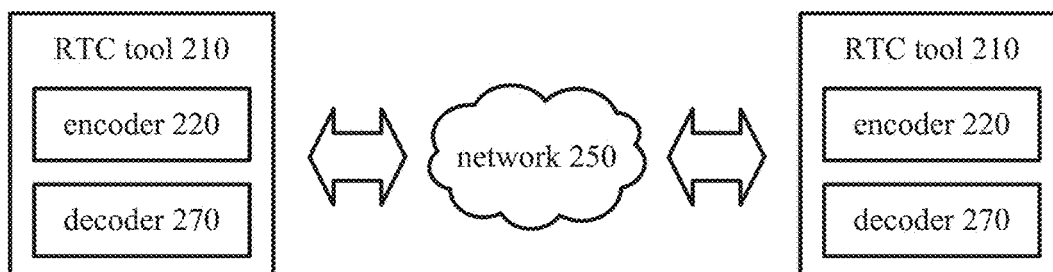
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO/IEC 14496-10 standard (also known as H.264 or AVC), HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation, video distribution system (e.g., a streaming video streaming distribution system) or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include coded data for RAP pictures having the strategic constraints and/or unit types described in Sections V, VI, and VII.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding.

The encoder (340) encodes the selected frame (331) to produce a coded frame (341) and also produces memory management control operation (MMCO) signals (342) or reference picture set (RPS) information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format or other format.

For example, within the encoder (340), an inter-coded, predicted frame is represented in terms of prediction from reference frames. A motion estimator estimates motion of macroblocks, blocks or other sets of samples of a source frame (341) with respect to one or more reference frames (369). When multiple reference frames are used, the multiple reference frames can be from different temporal directions or the same temporal direction. The motion estimator outputs motion information such as motion vector information, which is entropy coded. A motion compensator applies motion vectors to reference frames to determine motion-compensated prediction values. The encoder determines the differences (if any) between a block's motion-compensated prediction values and corresponding original values. These prediction residual values are further encoded using a frequency transform, quantization and entropy encoding. Similarly, for intra prediction, the encoder (340) can determine intra-prediction values for a block, determine prediction residual values, and encode the prediction residual values. In particular, the entropy coder of the encoder (340) compresses quantized transform coefficient values as well as certain side information (e.g., motion vector information, quantization parameter values, mode decisions, parameter choices). Typical entropy coding techniques include Exp-Golomb coding, arithmetic coding, differential coding, Huffman coding, run length coding, variable-length-to-variable-length (V2V) coding, variable-length-to-fixed-length (V2F) coding, LZ coding, dictionary coding, probability interval partitioning entropy coding (PIPE), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames that are used by the encoder (340) in motion estimation and compensation. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are also buffered in a temporary coded data area (370).

The coded data that is aggregated in the coded data area (370) can contain, as part of the syntax of an elementary coded video bitstream, coded data for RAP pictures having the strategic constraints and/or unit types described in Sections V, VI, and VII. The coded data that is aggregated in the coded data area (370) can also include media metadata relating to the coded video data (e.g., as one or more parameters in one or more supplemental enhancement information (SEI) messages or video usability information (VUI) messages).

The aggregated data (371) from the temporary coded data area (370) are processed by a channel encoder (380). The channel encoder (380) can packetize the aggregated data for transmission as a media stream (e.g., according to a media container format such as ISO/IEC 14496-12), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include coded data for RAP pictures having the strategic constraints and/or unit types described in Sections V, VI, and VII.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media container format such as ISO/IEC 14496-12), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) can contain, as part of the syntax of an elementary coded video bitstream, coded data for RAP pictures having the strategic constraints and/or unit types described in Sections V, VI or VII. The coded data (421) in the coded data area (430) can also include media metadata relating to the encoded video data (e.g., as one or more parameters in one or more SEI messages or VUI messages). In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms and motion compensation. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and makes the received encoded data available to an entropy decoder. The entropy decoder entropy decodes entropy-coded quantized data as well as entropy-coded side information, typically applying the inverse of entropy encoding performed in the encoder. Sections V, VI, and VII describe examples of coded data for RAP pictures, strategic constraints, and/or unit types that can be decoded by the decoder 450. A motion compensator applies motion information to one or more reference frames to form motion-compensated predictions of sub-blocks, blocks and/or macroblocks (generally, blocks) of the frame being reconstructed. An intra prediction module can spatially predict sample values of a current block from neighboring, previously reconstructed sample values. The decoder (450) also reconstructs prediction residuals. An inverse quantizer inverse quantizes entropy-decoded data. An inverse frequency transformer converts the quantized, frequency domain data into spatial domain information. For a predicted frame, the decoder (450) combines reconstructed prediction residuals with motion-compensated predictions to form a reconstructed frame. The decoder (450) can similarly combine prediction residuals with spatial predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . .

, 46n). The decoded frame storage area (460) is an example of a DPB. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Improvements to Bitstreams Having CRA Pictures

This section describes several variations for encoding and/or decoding bitstreams having clean random access (CRA) pictures. In particular, this section presents examples in which bitstreams having CRA pictures are allowed to have mid-bitstream CRA pictures potentially having one or more non-decodable leading pictures. Any of the encoders or decoders described above can be adapted to use the disclosed encoding and decoding techniques.

According to JCTVC-11003_d5, a CRA picture is a coded picture containing only I slices (slices that are decoded using intra prediction only). Further, all coded pictures that follow a CRA picture both in decoding order and output order must not use inter prediction from any picture that precedes the CRA picture either in decoding order or output order; and any picture that precedes the CRA picture in decoding order also precedes the CRA picture in output order. A "leading picture" is a coded picture that follows some other particular picture in decoding order and precedes it in output order. When a leading picture is associated with a CRA picture, it is a coded picture that follows the CRA picture in decoding order but precedes the CRA picture in output order. A leading picture associated with a CRA picture has a picture order count that is less than the picture order count of the CRA picture.

According to JCTVC-11003_d5, an "instantaneous decoding refresh picture" or "IDR picture" is a coded picture that causes the decoding process to mark all reference pictures as "unused for reference." All coded pictures that follow an IDR picture in decoding order can be decoded without inter prediction from any picture that precedes the IDR picture in decoding order. The first picture of each coded video sequence in decoding order is an IDR picture or a CRA picture.

Figure 5:
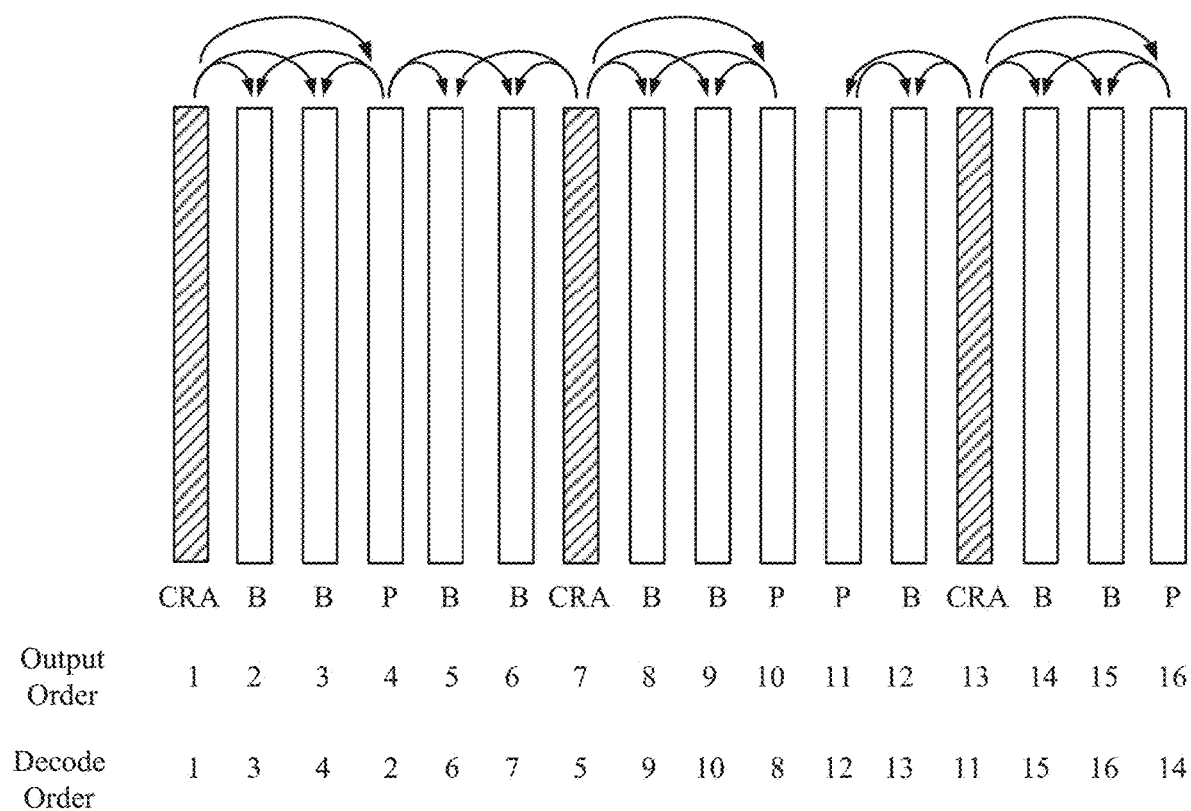
FIG. 5 is a diagram illustrating an example sequence of coded pictures, including CRA pictures.

FIG. 5 is a block diagram (500) illustrating a series of pictures comprising three CRA pictures, multiple pictures comprising bi-directionally predicted slices ("B" pictures), and multiple pictures comprising uni-directionally predicted slices ("P" pictures). The arrows in FIG. 5 are used to illustrate from which pictures the B pictures and the P pictures depend for purposes of motion compensation (e.g., according to one or more motion vectors). FIG. 5 also illustrates the output order and the decode order of the pictures. The first CRA picture in the series shown in FIG. 5 is at the beginning of a bitstream in decode order, and the remaining two CRA pictures are in the middle of the bitstream (that is, after the beginning of the bitstream in decode order). For the second CRA picture (picture 5 in decode order) or third CRA picture (picture 11 in decode order), there are several leading pictures that follow the CRA picture in decode order but precede it in output order. For each of these CRA pictures, a flag indicates information about the leading pictures that may follow the CRA picture, as explained below.

According to a previous HEVC submission, JCTVC-H0496, a bitstream was allowed to begin with a CRA picture that is not an IDR picture. For example, the series shown in FIG. 5 begins with a CRA picture. Further, such a CRA picture was allowed to have non-decodable leading pictures (pictures that follow the CRA picture in decoding order but precede it in output/display order that contain references to reference pictures that are not actually present in the bitstream). According to JCTVC-H0496, if the bitstream starts with a CRA picture, the leading pictures associated with the CRA picture, if present in the bitstream, are ignored (removed from the bitstream or discarded). (FIG. 5 does not show such leading pictures after the $1^{st}$ CRA picture, which is picture 1 in decode order.)

Allowing a bitstream to begin with a CRA picture that is not an IDR picture is intended to increase editing flexibility. JCTVC-11003_d5 required a CRA splice point that lies in the middle of the bitstream to be "sensible." That is, it required all of the leading pictures of the CRA picture to be fully decodable when the decoder starts decoding the bitstream at an IDR or CRA earlier than the current CRA picture. The decoded picture buffer (DPB) was required to contain all of the pictures that are referenced by the syntax of the leading pictures (in the DPB picture set description syntax or referenced for inter prediction). Thus, if a CRA picture after the start of the bitstream had leading pictures, the pictures were understood to be decodable. For example, in FIG. 5 the third CRA picture (which is the $11^{th}$ picture in decode order) is followed by two pictures in decode order (pictures 12 and 13 in decode order) that precede it in output order. These two leading pictures are dependent only on the third CRA picture. For that reason, they would be decodable even if decoding starts at the third CRA point as a random access point. If placement of a CRA picture is constrained such that any leading pictures are guaranteed to be decodable, however, an encoder may be strictly limited in where it can designate pictures as CRA pictures.

According to certain embodiments of the disclosed technology, the requirement about decodability of leading pictures of a CRA picture is removed as being unnecessary and undesirable. Embodiments of the disclosed technology additionally allow CRA pictures that are not at the beginning of the bitstream to provide information to a decoder indicative of the presence and type of leading pictures associated with the mid-stream CRA picture. As more fully explained below, such CRA pictures are sometimes referred to herein as BLA pictures and can have one of a plurality of broken link access picture types. Accordingly, encoders or video processing devices using such embodiments can more flexibly place BLA-type CRA pictures within a bitstream, as illustrated in FIG. 5. In FIG. 5, the second CRA picture (picture 5 in decode order) is followed by two leading pictures in decode order (pictures 6 and 7 in decode order) that precede the CRA picture in output order (pictures 5 and 6 in output order versus picture 7 in output order). In the previous approach, a mid-bitstream CRA picture could not be used as a splice point or as a random access point to begin decoding as part of a scan, fast-forward, rewind, or bitstream switching operation because the second CRA has leading pictures with motion compensation dependencies on reference pictures before the CRA picture in decoding and such reference pictures would not be guaranteed to be available. In FIG. 5, for example, the leading pictures that are 6$^{th}$ and 7$^{th}$ in decode order are dependent on the picture that is 2nd in decode order. Using embodiments of the disclosed technology, however, the second CRA picture can be designated as a BLA picture (e.g., using a flag or syntax element that identified the picture as a BLA-type CRA picture (sometimes referred to herein as just a "BLA picture") when the splicing operation or random access operation or bitstream switching operation occurs. Such an indication can be used by a decoder to properly process any non-decodable leading pictures associated with the BLA (e.g., by not decoding the non-decodable leading pictures, by not outputting the non-decodable leading pictures, or otherwise dropping the non-decodable pictures). Furthermore, in some implementations and as more fully explained below, multiple types of BLA pictures can be specified, thereby providing the decoder with additional information about whether and what type of leading pictures may be associated with the BLA picture. These multiple BLA types provide additional information so that the decoder can properly decode the bitstream and output only decodable pictures.

In certain implementations, a syntax element for a CRA picture indicates the potential presence of a "broken link" in that leading pictures for the CRA picture may be missing reference pictures needed for decoding those leading pictures. For example, a flag signalling whether non-decodable leading pictures are potentially present is added to the picture-level information of a CRA picture. The flag can be added to the slice header or to another syntax location that can be established (e.g., another appropriate place for picture-level information, such as the APS). In one particular implementation, when this flag is equal to "1", the bitstream is allowed to contain leading pictures of the CRA picture that are not decodable due to missing preceding reference pictures (as is currently the case with leading pictures of a CRA picture that starts a bitstream). Thus, during decoding, the flag signals the decoder to ignore or discard leading pictures associated with the CRA picture (including leading pictures that might be decodable).

In a particular implementation, a CRA picture with a broken link flag equal to "1" would act essentially the same way as an IDR picture, except as follows:

The CRA picture would be allowed to be followed (in bitstream order) by leading pictures that might refer to pictures that are not present in the bitstream. Leading pictures of the CRA picture would be ignored and discarded by the decoder. For instance, the standard for the decoder would specify that the decoder skip the decoding process for all leading pictures of the CRA picture and not output them (as is already the case for a CRA picture at the beginning of the bitstream). The broken link flag therefore indicates to the decoder that the leading pictures associated with the CRA picture should be ignored and discarded, even though one or more of the leading picture might, in fact, be decodable.

Further, the CRA's picture order count would not be required to be equal to "0". Instead, and in one example implementation, the picture order count MSBs would be set to "0" and the LSBs would be set to the LSB value sent in the CRA picture (as is already specified for CRA pictures at the beginning of the bitstream). Furthermore, in some implementations, the picture order count of an IDR picture is allowed to be non-zero. In other words, the picture order count of an IDR picture is not required to be equal to "0".

In certain implementations, a CRA picture with a broken link flag (e.g., broken_link_flag) equal to "1" also contains a no_output_of_prior_pics_flag that acts in the same way as for an IDR picture, and a random_access_pic_id that acts in the same way as the idr_pic_id of IDR pictures. In some implementations, the current idr_pic_id is renamed to random_access_pic_id and its constraints made to apply to both CRA pictures and IDR pictures rather than just to IDR pictures only. Furthermore, like an IDR picture, a CRA picture with the broken link flag equal to "1" could activate a different SPS, change the picture size, etc.

In this implementation, when the value of the broken link flag is "0" for a CRA picture, the bitstream is not allowed to contain leading pictures of the CRA picture that might not be decodable due to missing preceding reference pictures unless that CRA picture is the first picture in the bitstream (in decode order). That is, the bitstream contains no leading pictures after a CRA picture with broken link flag of "0" in decode order unless such leading pictures are fully decodable when decoding starts at an earlier CRA or IDR picture in decode order. Thus, during decoding, the flag signals the decoder to decode the leading pictures associated with the CRA picture. When the CRA picture is the first picture in the bitstream and has a broken link flag of "0", however, then the flag can be ignored and the CRA picture can be treated "as if" the broken link flag was "1".

In the example shown in FIG. 5, for the second CRA picture (picture 5 in decode order), the value of the flag could be "1" since some leading pictures may be missing a reference picture upon random access. This allows the second CRA picture in FIG. 5 to be used for greater random access functionality than previously possible. For example, the second CRA picture could now be used as a starting picture as part of a scan, fast forward, rewind operation, or bitstream switching operation. Furthermore, the second CRA picture could be used as a splice point where the bitstream is cropped to begin at the second picture and then appended to the end of another bitstream. Because the second CRA picture is identified as a BLA picture (broken link flag value of "1"), the resulting bitstream can be properly decoded and represents a valid bitstream. Additionally, in certain implementations, a video encoder or video processing device can alter the status of a CRA picture to become a BLA picture. For example, as part of the splicing operation, a video processing device can modify the designation of a CRA picture to indicate that it is a BLA picture so that the resulting spliced bitstream will be valid. For the third CRA picture (picture 11 in decode order), the value of the flag would be "0" since no leading picture will be missing a reference picture upon random access.

Although the above-described embodiments refer to a "flag" for signalling whether the decoder should skip non-decodable leading pictures associated with a CRA picture, any suitable indicator can be used. For example, in some implementations, another picture-level indicator or syntax element that specifies various characteristics of a picture is used. In some implementations, the syntax element used for this purpose may be the syntax indicator known as the network abstraction layer ("NAL") unit type (or other indicator associated with a picture in the bitstream) associated with a given CRA picture. For example, one NAL unit type value may be used for CRA pictures that are indicated to have a potential "broken link" status, and another NAL unit type value may be used for CRA pictures that are indicated not to have such a potential "broken link" status. Furthermore, although the above-described embodiments refer to "clean" random access pictures, the innovations disclosed herein can be used in connection with any random access picture or equivalent (such as a recovery frame or other picture potentially used to begin a bitstream). Furthermore, in such alternative embodiments, the indicator can be used to signal the possibility of associated non-decodable pictures of any type (not just leading pictures that are identified based on temporal output order; e.g., including leading pictures identified in some other way).

Although the above-described embodiments refer to the identification of a potentially non-decodable picture by determination of whether or not a picture is a leading picture of the CRA picture (that is, by identifying whether a picture that follows the CRA picture in decoding order precedes it in output order), other or additional classification rules or indicators may be used to identify the potentially non-decodable pictures. For example, a "flag" or syntax element value, or other indicator associated with a picture in the bitstream, can be sent with each picture to indicate whether or not it is a potentially non-decodable picture, regardless of its output order position relative to the output order position of an associated CRA picture. In other words, the indicator is signaled for the picture that is potentially non-decodable. In some implementations, the syntax element used for this purpose may be the syntax indicator known as the NAL unit type. For example, for pictures that are indicated not to be CRA pictures, one NAL unit type value may be used by a picture that is to be discarded as a potentially non-decodable picture when a random access decoding process begins at the location of the CRA picture or a "broken link" CRA picture has been indicated, and another NAL unit type value may be used by pictures that are indicated to be decodable. A leading picture that is to be discarded as a potentially non-decodable picture is sometimes referred to herein (or indicated in a bitstream) as a tagged-for-discard (TFD) picture or a random access skipped leading (RASL) picture. A leading picture that is decodable is sometimes referred to herein (or indicated in a bitstream) as a random access decodable leading (RADL) picture (or decodable leading picture (DLP)).

In some embodiments, the determination of whether or not a picture can be decoded may not only include identification of whether the decoding process of a picture may depend on some pictures that appear prior to a CRA picture in bitstream order, but also may include identification of whether the decoding process of a picture may depend on some pictures that appear prior to more than one CRA picture in bitstream order. This determination can be helpful, for example, as it is typically necessary for the decoder to be able to identify whether pictures can be decoded that follow more than one CRA picture that is encountered after a random access decoding process is initiated. In such scenarios, it may be helpful to constrain reference picture selection as follows-a picture shall not use any picture in the bitstream as a reference for inter-picture prediction that precedes more than x CRA pictures in decoding order. For example, x is two. Without such a constraint, recovery may not be assured when performing random access by a decoder-even after multiple CRA pictures have been encountered.

In many respects, use of IDR pictures is unnecessary if the pictures that are to be discarded under some circumstances are indicated explicitly. An IDR picture can be followed in bitstream order by leading pictures (in output order) that are to be decoded and output when performing random access by a decoder. If the classification of whether a picture is to be decoded or not is determined by an explicit syntax indicator (such as the NAL unit type) rather than determined implicitly by the picture order count, then a CRA picture can have all the functionality of an IDR picture. For instance, in certain specific implementations, a syntax element value or other indicator (such as the NAL unit type value) associated with a picture in a bitstream can be used to identify at least the following four types of pictures:

One type that identifies the picture to be a CRA picture without a "broken link", One type that identifies the picture to be a CRA picture with a "broken link", One type that identifies the picture to be a picture that is always to be decoded when the decoding process began at the location of any preceding CRA picture in bitstream order, and One type that identifies the picture to be a picture that is not to be decoded when random access has been performed at the random access point of the preceding CRA picture in bitstream order or when the preceding CRA picture in bitstream order is indicated as a "broken link".

VI. Strategic Constraints and Unit Types for RAP Pictures

In the HEVC draft JCTVC-I1003_d5, a RAP ("random access point") picture is represented by NAL unit types 4 to 8. Depending on the characteristics of the RAP picture, for some types of media container format, the unit type can be mapped to one of the three SAP ("stream access point") types described below, which are also defined in ISO/IEC 14496-12 4$^{th}$ Edition, "Information technology—Coding of audio-visual objects—Part 12: ISO base media file format", w12640, 100$^{th}$ MPEG meeting, Geneva, April 2012. Although a total of 6 SAP types are defined, a RAP picture can only be mapped to three of the SAP types of that document. The available SAP types include: Type 1, Type 2, and Type 3.

Type 1 corresponds to some examples of a "closed GOP random access point" (in which all access units, in decoding order, starting from the point $I_{SAP}$ can be correctly decoded, resulting in a continuous time sequence of correctly decoded access units with no gaps), for which the access unit in decoding order is also the first access unit in presentation order.

Type 2 corresponds to other examples of "closed GOP random access point", for which the first access unit in decoding order in the media stream starting from the point $I_{SAU}$ is not the first access unit in presentation order.

Type 3 corresponds to examples of "open GOP random access point", in which there are some access units in decoding order following the point $I_{SAU}$ that cannot be correctly decoded and have presentation times less than the time $T_{SAP}$.

From a systems perspective, it is desirable to make the SAP mapping as simple as possible while allowing the use of as many types as possible. In some embodiments of the disclosed technology, a RAP picture includes one or more of the following constraints and adjustments to permitted unit types.

In the following examples, a RAP picture can be further classified into a CRA picture, BLA ("broken link access") picture or IDR picture, depending on the NAL unit type. In the HEVC design in JCTVC-I1003_d5, a CRA picture is represented by NAL unit types 4 and 5, a BLA picture is represented by NAL unit types 6 and 7, and an IDR picture is represented by a NAL unit type of 8. A NAL unit type of 5 and 7 can only be used for a CRA and BLA picture respectively only when the CRA or BLA picture does not have any associated TFD ("tagged for discard") pictures.

A. Removal of IDR Pictures or Constraint on IDR Pictures

Consistent with some of the embodiments disclosed above in Section V, the concept of BLA pictures has been adopted into the HEVC design in JCTVC-I1003_d5 from the proposal JCTVC-I0404 (G. J. Sullivan, "CRA pictures with broken links", JCTVC-I0404, 9$^{th}$ meeting, Geneva, April 2012). That proposal also pointed out that a CRA/BLA picture can achieve the functionality of an IDR picture (and more) and hence recommended that the concept of an IDR picture be dropped from the HEVC design, but IDR pictures remained in the HEVC design in JCTVC-I1003_d5.

In certain embodiments of the disclosed technology, IDR pictures are still used, but encoding follows a further constraint that simplifies the mapping of an IDR picture to an SAP type.

In the HEVC design in JCTVC-I1003, an IDR picture can map to SAP types 1 or 2. If the IDR picture has leading pictures (coded (and decodable) pictures that follow the current picture in decoding order but precede it in output order), it will be mapped to SAP type 2. If the IDR picture does not have leading pictures, it will be mapped to SAP type 1. So, when a system encounters an IDR picture, the system must check whether there are leading pictures or not in order to determine the correct mapping to SAP type, which can unnecessarily consume computing and storage resources to check for a rare case.

According to one exemplary embodiment of the disclosed technology, IDR pictures are constrained to not have leading pictures. With this constraint, an IDR picture always maps to a SAP of type 1.

B. NAL Unit Types for CRA/BLA Pictures

In certain implementations of the disclosed technology, when there are no TFD pictures, the functionality of a CRA picture is identical to that of a BLA picture. Hence, the necessity of defining two NAL unit types for this purpose can be avoided, and a single type value can indicate a CRA picture or BLA picture with no associated TFD pictures.

Moreover, a CRA/BLA picture with no associated TFD pictures can map to SAP types 1 or 2 depending on whether it has leading pictures or not. In particular implementations, one of the redundant NAL unit types can be used to indicate the case where a CRA/BLA picture directly maps to SAP type 1 (which occurs when the CRA/BLA picture has no leading pictures). This simplifies mapping to an appropriate SAP type for the common case of a CRA/BLA with no leading pictures.

One specific exemplary implementation comprises NAL unit types (in this example, NAL unit types 4 through 7) defined as in Table 1 below:

TABLE 1

| NAL unit type | Description | SAP types possible |
| --- | --- | --- |
| 4 | CRA picture | 1, 2, 3 |
| 5 | BLA picture | 1, 2, 3 |
| 6 | CRA/BLA picture with no associated TFD pictures | 1, 2 |
| 7 | CRA/BLA picture with no leading pictures | 1 |

Another specific exemplary implementation comprises NAL unit types (in this example, NAL unit types 16-21) as defined below. In this example, TFD leading pictures are referred to as random access skipped leading ("RASL") pictures. In particular implementations, all RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. Further, RASL pictures are not used as reference pictures for the decoding process of non-RASL pictures. In certain example implementations, when present, all RASL pictures precede, in decoding order, all trailing pictures of the same associated RAP picture. Furthermore, in the example below, decodable leading pictures are referred to as random access decodable leading (RADL) pictures. In particular implementations, all RADL pictures are leading pictures, and RADL pictures are not used as reference pictures for the decoding process of trailing pictures of the same associated RAP picture. In certain example implementations, when present, all RADL pictures precede, in decoding order, all trailing pictures of the same associated RAP picture. Further, in particular implementations, the BLA picture (a) contains only I slices, and may be the first picture in the bitstream in decoding order, or may appear later in the bitstream; (b) begins a new coded video sequence, and has the same effect on the decoding process as an IDR picture; and (c) contains syntax elements that specify a non-empty reference picture set.

TABLE 2

| NAL unit type | Description | NAL unit type name |
| --- | --- | --- |
| 16 | A BLA picture that may have associated RASL pictures, which are not output by the decoder and may not be decodable, as they may contain references to pictures that are not present in the bitstream. The BLA picture may also have associated RADL pictures, which are specified to be decoded. | BLA_W_LP |
| 17 | A BLA picture that does not have associated RASL pictures but may have associated RADL pictures, which are specified to be decoded. | BLA_W_DLP |
| 18 | A BLA picture that does not have any associated leading pictures pictures | BLA_N_LP |
| 19 | An IDR picture that does not have associated RASL pictures present in the bitstream, but may have associated RADL pictures in the bitstream. | IDR_W_DLP |
| 20 | An IDR picture that does not have associated leading pictures present in the bitstream. | IDR_N_LP |
| 21 | A CRA picture | CRA_NUT |

Alternatively, other type values are used for the video elementary bitstream data (e.g., other NAL unit type values, or other video type values) and/or the media container format data (e.g., other SAP type values or other container format values), consistent with one or more of these constraints on RAPs and permitted combinations of types of pictures.

C. Constraint on the Bitstream Order of Leading Pictures

When an encoding system maps a RAP picture into one of the possible SAP types, it checks for the existence of leading pictures and, if present, whether any of the pictures is a TFD picture. According to constraints on inter-picture dependencies in the HEVC design in JCTVC-I1003_d5, leading pictures of a current RAP picture can be present anywhere in the bitstream after the current RAP picture and the next RAP picture. The extent of the search for leading pictures is potentially very long.

In order to make this search simpler, and according to certain implementations of the disclosed technology, a constraint exists to ensure the occurrence of all leading pictures in the bitstream (that is, in decoding order) prior to any non-leading picture for a RAP picture. That is, for a given RAP picture, the bitstream is constrained so that all leading pictures for that RAP picture occur in the bitstream (that is, in decoding order) prior to any non-leading pictures for that RAP picture.

VII. General Embodiments for Implementing Aspects of the Disclosed Technology FIGS. 6-11 are flow charts illustrating example embodiments according to the disclosed technology. The methods shown in FIGS. 6-11 can include any one or more of the specific aspects disclosed above or below. Furthermore, the methods shown in FIGS. 6-11 should not be construed as limiting, as any one or more of the method acts shown therein can be used alone or in various combinations or sub-combinations with one another. Furthermore, the sequence of the method acts can, in some cases, be re-arranged or performed at least partially concurrently. Additionally, and as noted above, the methods disclosed in FIGS. 6-11 can be implemented as computer-executable instructions stored on a computer-readable storage medium (where such storage medium does not include propagating waves) or by a digital media processing system.

Figure 6:
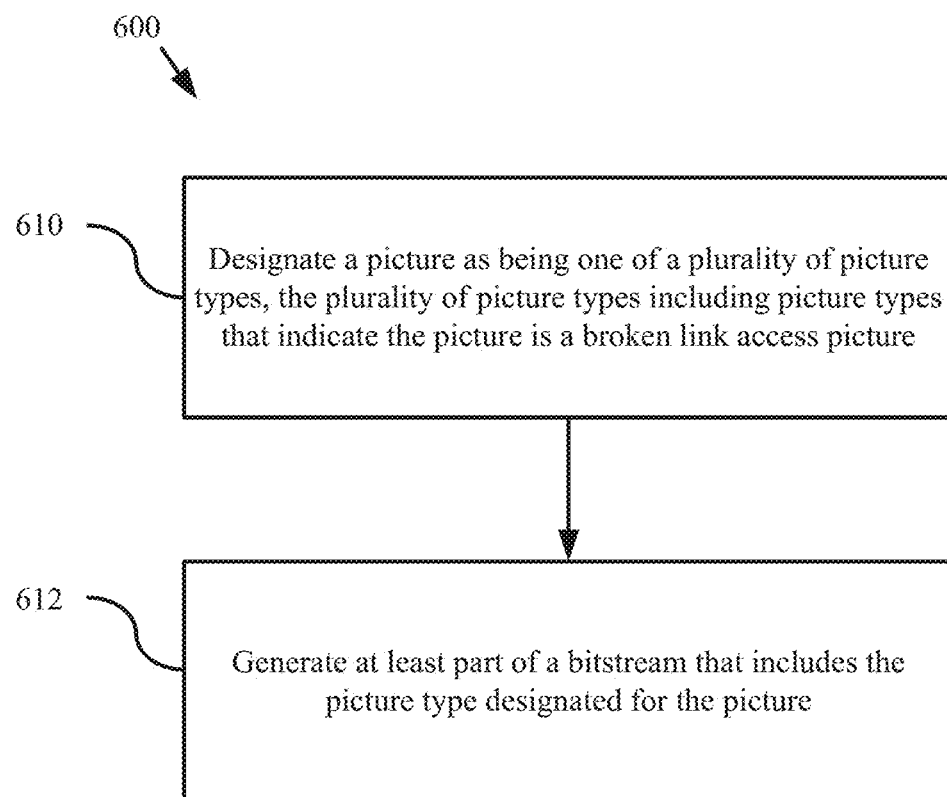
FIG. 6 is a flow chart showing a first exemplary method for generating a bitstream.

FIG. 6 is an example method 600 that can be performed by an encoder or digital media processing tool or device.

At 610, a picture (e.g., a picture from a group of pictures in a video sequence) is designated as being one of a plurality of picture types. In certain embodiments, the picture types include any one or more of the following: (1) a type indicating that the picture is a broken link access (BLA) picture that is capable of being used as a random access point (RAP) picture and further indicating that the picture does not have any associated non-decodable leading pictures but may have one or more associated decodable leading pictures; (2) a type indicating that the picture is a BLA picture that is capable of being used as a RAP picture and further indicating that the picture does not have any associated leading pictures; (3) a type indicating that the picture is a BLA picture that is capable of being used as a RAP picture and further indicating that the picture may have one or more associated decodable or non-decodable leading pictures; (4) a type indicating that the encoded picture is an instantaneous decoding refresh (IDR) picture that may have associated RADL pictures; (5) a type indicating that the encoded picture is an IDR that does not have any associated leading pictures; and/or (6) a type indicating that the encoded picture is a clean random access (CRA) picture that is capable of being used as a RAP picture.

As noted above, one or more of the types indicate that the picture is a BLA picture. In certain embodiments, a BLA picture contains only I slices, and may be the first picture in the bitstream in decoding order, or may appear later in the bitstream. Further, in these embodiments, a BLA picture begins a new coded video sequence, and has the same effect on the decoding process as an IDR picture; however, a BLA picture contains syntax elements that specify a non-empty reference picture set (which can be ignored during decoding).

In some embodiments, the first BLA type noted above indicates that the BLA picture does not have associated random access skipped leading (RASL) pictures but may have associated random access decodable leading (RADL) pictures, which are specified to be decoded (e.g., a NAL unit type can be used to specify the leading picture as either a RASL picture or RADL picture). In certain implementations, all RASL pictures are leading pictures of an associated BLA or CRA picture. When the associated RAP picture is a BLA picture or is the first coded picture in the bitstream, the RASL picture is not output by the decoder and may not be correctly decodable, as the RASL picture may contain references to pictures that are not present in the bitstream. RASL pictures are not used as reference pictures for the decoding process of non-RASL pictures. Further, in certain implementations, when present, all RASL pictures precede, in decoding order, all trailing pictures of the same associated RAP picture. Additionally, in some implementations, all RADL pictures are leading pictures. RADL pictures are not used as reference pictures for the decoding process of trailing pictures of the same associated RAP picture. Further, in certain implementations, when present, all RADL pictures precede, in decoding order, all trailing pictures of the same associated RAP picture. Although this type can have a wide variety of names, this type is named "BLA_W_DLP" in one particular implementation.

In some embodiments, the second BLA type noted above indicates that the BLA picture does not have any associated leading pictures. Although this type can have a wide variety of names, in one particular implementation, this type is named "BLA_N_LP".

In certain embodiments, the third BLA type noted above indicates that the BLA picture may have associated RASL pictures, which are not output by the decoder and may not be decodable, as they may contain references to pictures that are not present in the bitstream. This type also indicates that the BLA picture may also have associated RADL pictures, which are specified to be decoded. Although the this type can have a wide variety of names, this type is named "BLA_W_LP" in one particular implementation.

In some embodiments, the fourth type noted above indicates that the picture is an IDR picture that does not have associated RASL pictures present in the bitstream, but may have associated RADL pictures in the bitstream. In particular implementations, an IDR picture contains only I slices, and may be the first picture in the bitstream in decoding order, or may appear later in the bitstream. Each IDR picture is the first picture of a coded video sequence in decoding order. An IDR picture does not have associated RASL pictures. Although this type can have a wide variety of names, this type is named "IDR_W_DLP" in one particular implementation.

In certain embodiments, the fifth type noted above indicates that the picture is an IDR picture that does not have any associated leading pictures. Although this type can have a wide variety of names, this type is named "IDR_N_LP" in one particular implementation.

In some embodiments, the sixth type noted above indicates that the picture is CRA picture. In particular implementations, a CRA picture contains only I slices, and may be the first picture in the bitstream in decoding order, or may appear later in the bitstream. Further, a CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream. Although this type can have a wide variety of names, in one particular implementation, this type is named "CRA_NUT".

At 612, at least part of a bitstream is generated. In the illustrated embodiment, the at least part of the bitstream comprises the picture type designated for the picture (e.g., as a syntax element, such as the NAL unit type).

In certain implementations, the method 600 is performed by an encoder and the method further comprises encoding the picture. The bitstream can further include the encoded picture. A wide variety of encoding techniques can be used. For example, any of the encoding techniques described above can be used. In certain embodiments, the encoded picture that is designated as a BLA picture is not the first picture of the bitstream.

In some embodiments, the method further comprises encoding one or more leading pictures and non-leading pictures associated with the encoded picture. In such embodiments, the act of generating the at least a portion of a bitstream can further comprise ordering the encoded leading pictures and encoded non-leading pictures such that all of the encoded leading pictures precede all of the encoded non-leading pictures in the at least a portion of a bitstream. The leading pictures can also be designated as either a RADL or RASL picture (e.g., using a NAL unit type value).

Figure 7:
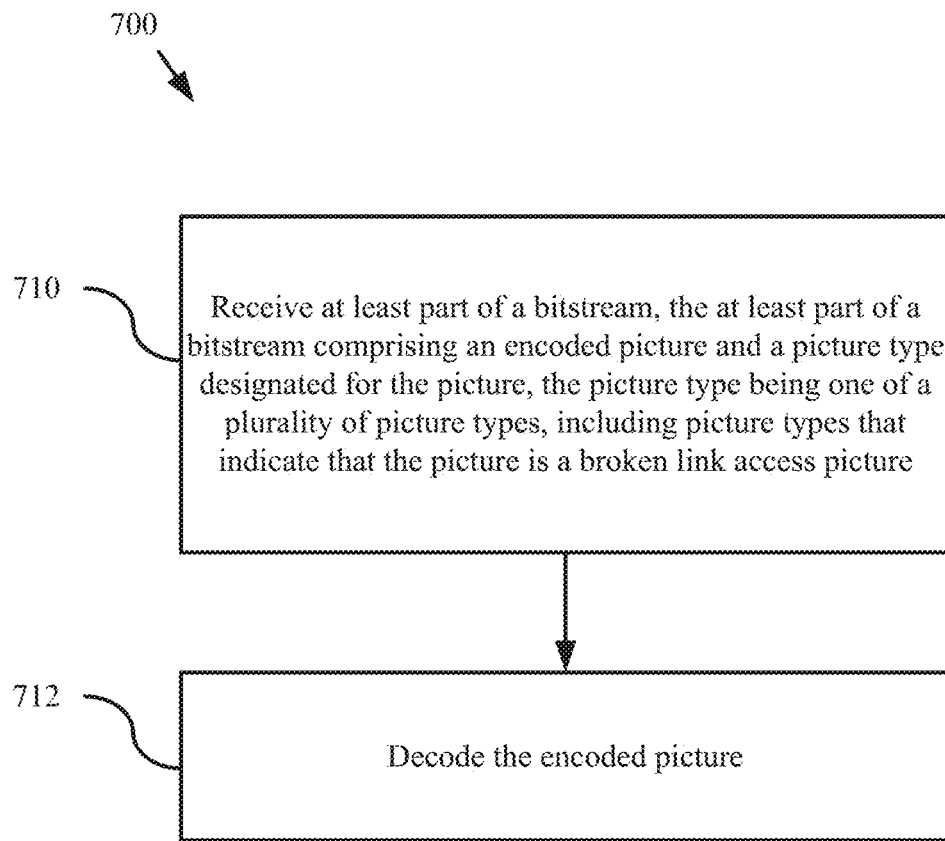
FIG. 7 is a flow chart showing a first exemplary method for decoding a bitstream.

FIG. 7 is an example method 700 performed by a decoder or digital media processing tool or device. In general, the method 700 can be performed to decode the bitstream generated from, for example, the method 600 of FIG. 6.

At 710, at least part of a bitstream is received (e.g., buffered, accessed, loaded, or otherwise prepared for further processing). In the illustrated embodiment, the at least part of the bitstream comprises an encoded picture and a picture type designated for the encoded picture. The picture type is selected from one of a plurality of picture types. In certain embodiments, the plurality of picture types include one or more of the following: (1) a type indicating that the encoded picture is a broken link access (BLA) picture that is capable of being used as a random access point (RAP) picture and further indicating that the encoded picture does not have any associated non-decodable leading pictures but may have one or more associated decodable leading pictures); (2) a type indicating that the encoded picture is a BLA picture that is capable of being used as a RAP picture and further indicating that the encoded picture does not have any associated leading pictures; (3) a type indicating that the encoded picture is a BLA picture that is capable of being used as a RAP picture and further indicating that the encoded picture may have one or more associated decodable or non-decodable leading pictures; (4) a type indicating that the encoded picture is an instantaneous decoding refresh (IDR) picture that may have associated RADL pictures; (5) a type indicating that the encoded picture is an IDR that does not have any associated leading pictures; and/or (6) a type indicating that the encoded picture is a clean random access (CRA) picture that is capable of being used as a RAP picture. Further details concerning exemplary implementations for the pictures types are described above with respect to FIG. 6.

At 712, the encoded picture is decoded. A wide variety of decoding techniques can be used. For example, any of the decoding techniques described above can be used.

In certain embodiments, the encoded picture is not the first picture of the bitstream. In some embodiments, the method further comprises decoding one or more leading pictures associated with the encoded picture of 710 and one or more non-leading pictures associated with the encoded picture of 710. In such embodiments, the at least a portion of the bitstream can be ordered such that all of the encoded leading pictures associated with the first picture precede all of the encoded non-leading pictures associated with the first picture. Additionally, the leading pictures can be designated as either a RADL or RASL picture (e.g., using a NAL unit type value).

Figure 8:
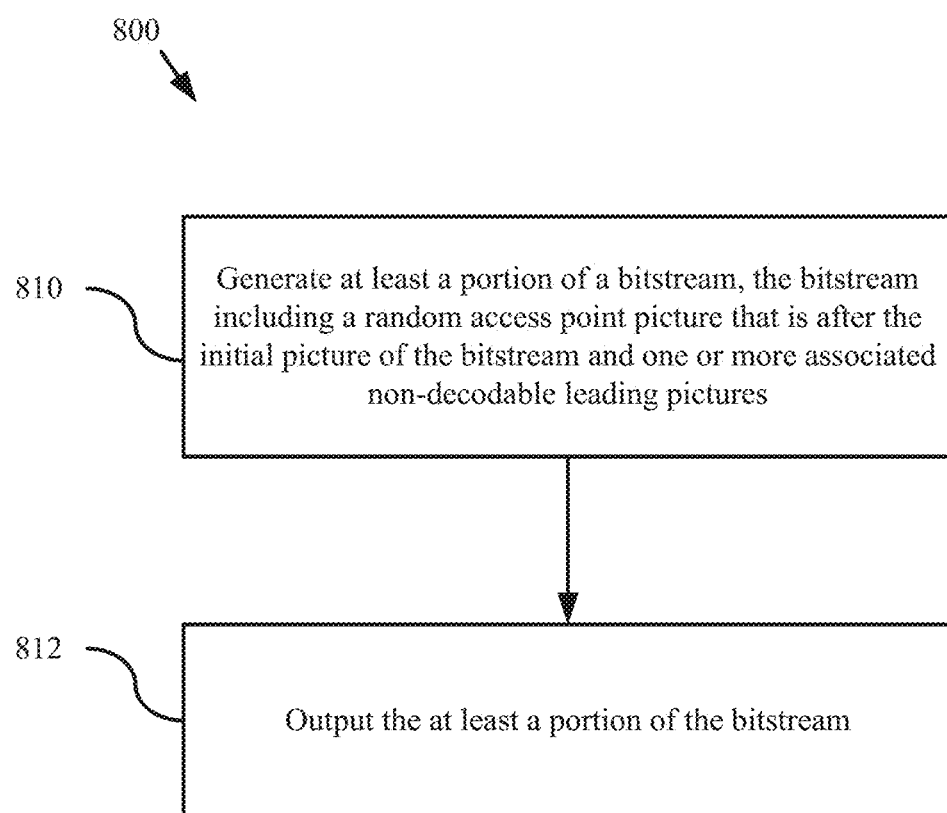
FIG. 8 is a flow chart showing a second exemplary method for generating a bitstream.

FIG. 8 is an example method 800 performed by an encoder or digital media processing tool or device.

At 810, at least a portion of a bitstream is generated. In the illustrated embodiment, the bitstream is generated such that it includes a random access point picture that is not the initial picture of the bitstream (e.g., the random access point picture is in a picture order position subsequent to an initial picture of the bitstream) and such that the random access point picture has one or more associated non-decodable leading pictures. Further, in the illustrated embodiment, the bitstream is generated to include an indication for a decoder that signals that the random access point picture is a picture from which a decoder can begin decoding.

In certain implementations, the indication includes further information. For example, the indication can further indicate whether a RAP picture has any associated leading pictures or not and, if the encoded picture has any associated leading pictures, whether all the associated leading pictures are decodable or not. The indication can have a variety of formats. For instance, in one implementation, the indication is a syntax element (such as a NAL unit type as shown, for example, in Table 2). In some implementations, the at least a portion of the bitstream further comprises one or more leading pictures for the encoded picture and one or more non-leading pictures for the encoded picture. In such implementations, the act of generating the at least a portion of the bitstream can comprise ordering the leading pictures for the encoded picture and the non-leading pictures for the encoded picture such that all of the leading pictures precede the non-leading pictures.

At 812, the at least a portion of the bitstream is output (e.g., by storing in a computer-readable storage medium, writing to a file, or other such form of outputting).

Figure 9:
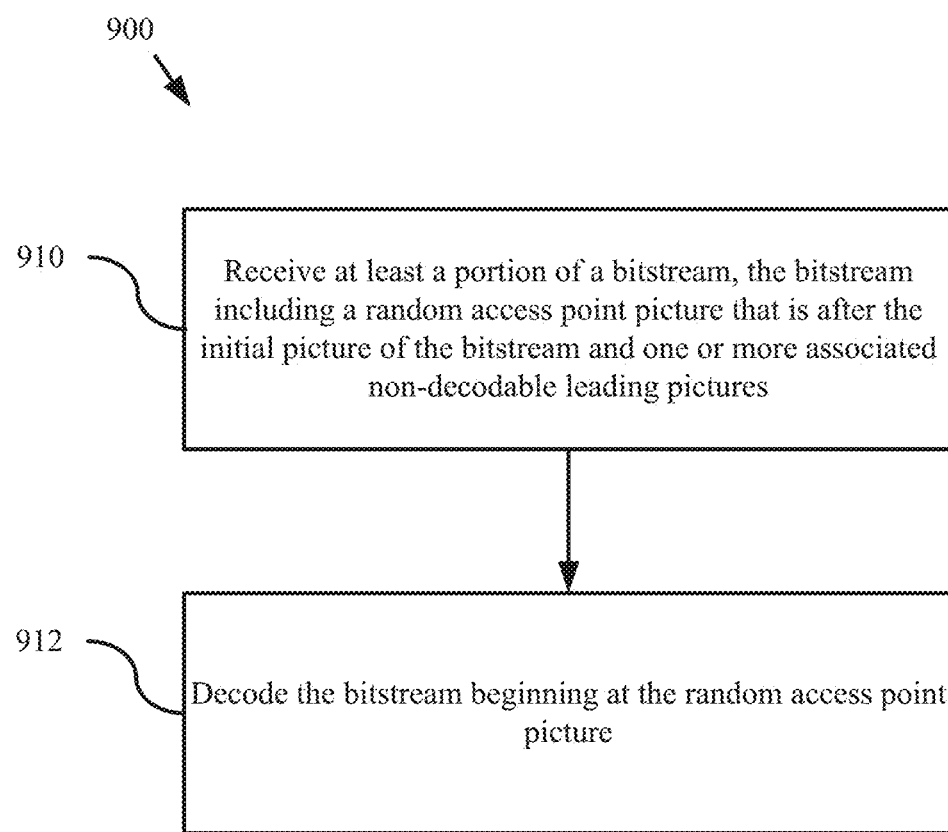
FIG. 9 is a flow chart showing a second exemplary method for decoding a bitstream.

FIG. 9 is an example method 900 performed by a decoder or digital media processing tool or device.

At 910, at least a portion of a bitstream is received. In the illustrated embodiment, the at least a portion of the bitstream comprises a random access point picture at a picture order position subsequent to an initial picture of the bitstream. Further, the at least a portion of the bitstream includes one or more non-decodable leading pictures associated with the random access point picture. The at least a portion of the bitstream can also comprise an indication of whether the random access point picture has any associated leading pictures or not and, if the random access point picture has any associated leading pictures, an indication of whether all the associated leading pictures are decodable. The indication can have a variety of formats. For instance, in one implementation, the indication is a syntax element (such as a NAL unit value as shown, for example, in Table 2) that signals whether the random access point picture has any associated leading pictures or not and, if the random access point picture has any associated leading pictures, an indication of whether all the associated leading pictures are decodable.

At 912, the random access point picture is decoded.

Figure 10:
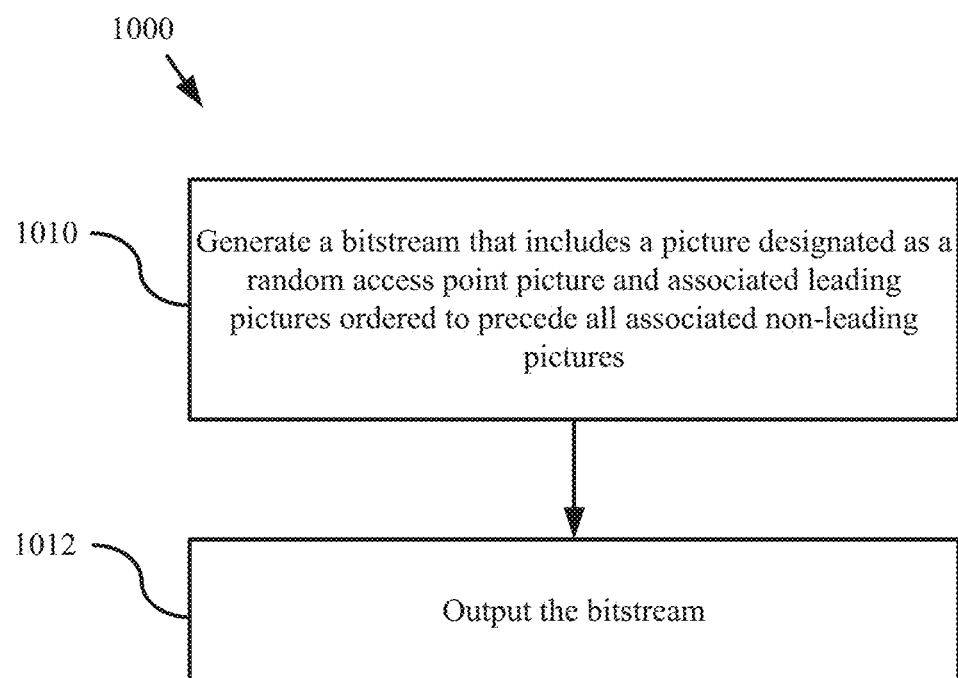
FIG. 10 is a flow chart showing a third exemplary method for generating a bitstream.

FIG. 10 is an example method 1000 performed by an encoder or digital media processing tool or device.

At 1010, a bitstream is generated that includes a picture designated to be a random access point ("RAP"). Furthermore, the generating is performed such that any and all leading pictures for the RAP precede any non-leading picture for the RAP in decoding order. At 1012, the bitstream is output (e.g., by storing the bitstream in a computer-readable storage medium or by writing the bitstream to a file).

Figure 11:
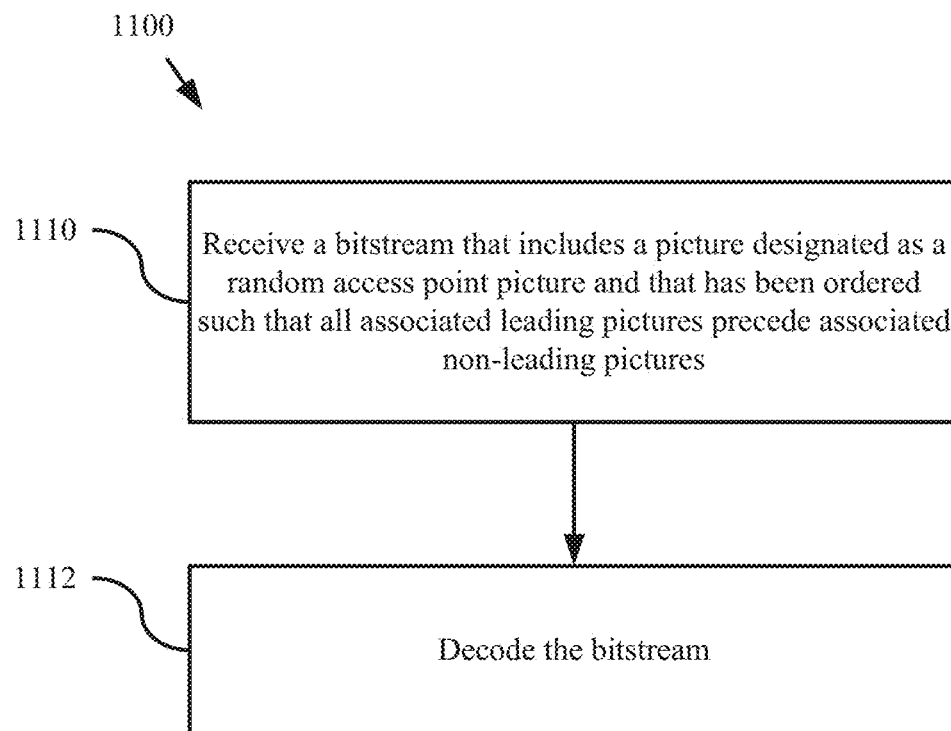
FIG. 11 is a flow chart showing a third exemplary method for decoding a bitstream.

FIG. 11 is an example method 1100 performed by a decoder or digital media processing tool or device.

At 1110, a bitstream comprising encoded data for plural pictures is received (e.g., buffered into memory, accessed, loaded, or otherwise input for further processing). In the illustrated embodiment, the bitstream includes a picture designated to be a random access point ("RAP") picture. Further, in the illustrated embodiment, the bitstream has been generated under a constraint that any and all leading pictures for the RAP precede in decoding order any non-leading picture for the RAP.

At 1112, the plural pictures are decoded.

Figure 12:
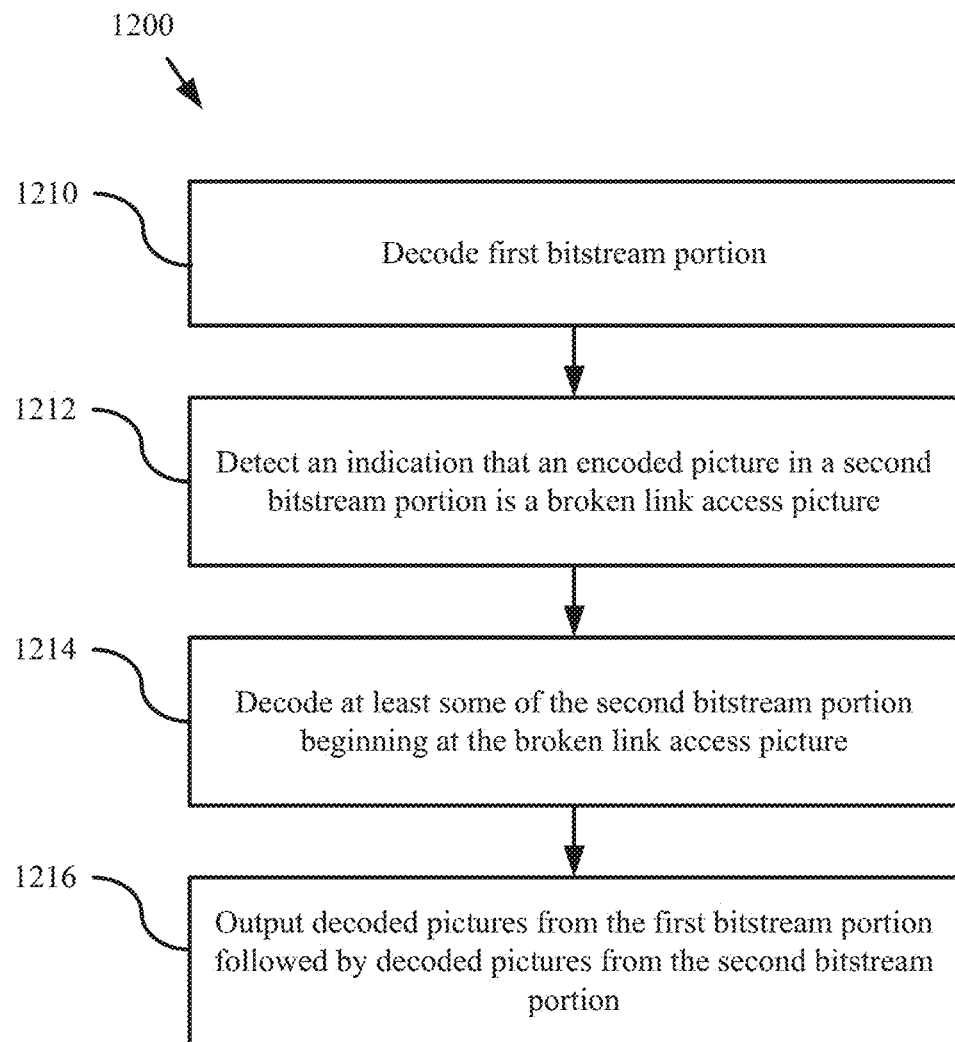
FIG. 12 is a flow chart showing a first exemplary method for processing bitstream portions.
Figure 13:
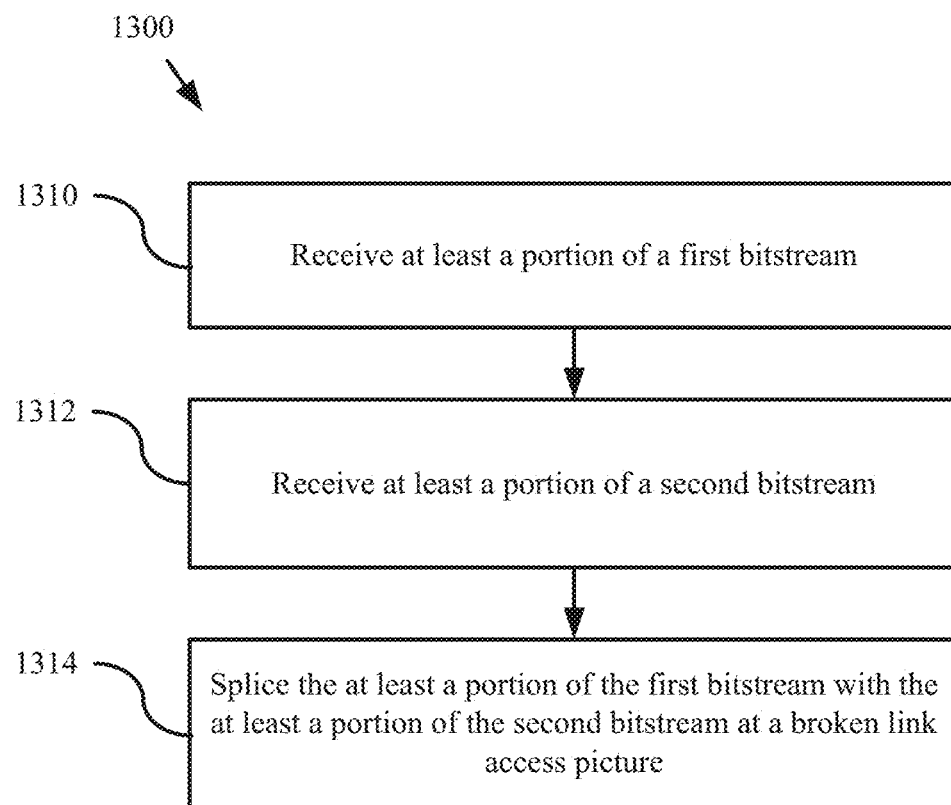
FIG. 13 is a flow chart showing a second exemplary method for processing bitstream portions.

Embodiments of the disclosed technology can be used to increase the number of available random access points from which a decoder can begin decoding without substantially affecting video playback quality. Thus, embodiments of the disclosed technology can improve the speed and/or seamlessness with which video coding systems can operate. For example, the use of BLA pictures and associated indicators can improve the performance of a wide variety of operations-such as fast forward operations, rewind operations, scanning operations, splicing operations, or switching operations between video streams—by presenting increased numbers of random access points for beginning the decoding process and by presenting information that can be used by a decoder to appropriately handle the video that begins at the random access point (e.g., at the BLA picture). FIGS. 12 and 13 below present exemplary video processing methods that take advantage of the BLA techniques disclosed herein. The disclosed techniques can be used in video encoding or video decoding systems to more flexibly perform adaptive video delivery, production editing, commercial insertion, and the like.

FIG. 12 is an example method 1200 performed by a media processing tool or device.

At 1210, a first bitstream portion is decoded. At 1212, an indication that an encoded picture in a second bitstream portion is a broken link access picture is detected (e.g., by parsing and processing a NAL unit type value for the picture). At 1214, at least some of the second bitstream portion is decoded beginning at the broken link access picture. In certain implementations, the decoding further includes skipping (e.g., not decoding or not outputting) one or more pictures of the second bitstream associated with the broken link access picture. For example, the decoder can decode leading pictures designated as RADL pictures and skip the decoding of pictures designated as RASL pictures. At 1216, the decoded pictures from the first bitstream portion are output followed by decoded pictures from the second bitstream portion.

The example method 1200 can be performed as part of a fast forward operation, rewind operation, or a scan operation (e.g., initiated by a user who wishes to scan to a particular point or time in a video stream) implemented by a media processing device (e.g., a video playback tool or device). In such instances, the bitstream portions are part of the same bitstream. The example method 1200 can also be performed when a stream, broadcast, or channel switching operation is performed (e.g., as performed by a video decoder used in connection with a cable, satellite, or Internet TV system). In such instances, the bitstream portions are from different bitstreams.

Furthermore, in certain implementations, the indication indicates that the encoded picture is one of a plurality of types of broken link access pictures, where the plurality of types include two or more of the following: a type that may include one or more leading pictures, a type that may contain one or more leading pictures but no non-decodable leading pictures, a type that contains no leading pictures. The indication may signal any one or more of the other types disclosed herein as well.

FIG. 13 is an example method 1300 performed by a media processing device or application.

At 1310, at least a portion of a first bitstream is received. At 1312, at least a portion of a second bitstream is received. At 1314, the at least a portion of the first bitstream is spliced with the at least a portion of the second bitstream at a broken link access picture. In certain embodiments, the splicing operation additionally comprises omitting random access skipped leading (RASL) pictures associated with the broken link access picture. Furthermore, in some embodiments, the splicing can include identifying a clean random access picture as the splice point and designating the clean random access picture as the broken link access picture in the spliced bitstream. Furthermore, in certain embodiments, the method can further comprise detecting an indication (e.g., by parsing and processing a NAL unit type value for the picture) that the broken link access picture is one of a plurality of broken link access picture types (e.g., any of the types disclosed herein).

The method 1300 can be performed, for example, by a video editing device or application, or by a media playback device or application. In certain embodiments, the indication indicates that the encoded picture is one of a plurality of types of broken link access pictures, wherein the plurality of types include any two or more of the following: a type that may include one or more leading pictures, a type that may contain one or more leading pictures but no non-decodable leading pictures, or a type that contains no leading pictures. The indication may signal any one or more of the other types disclosed herein as well.

Figure 14:
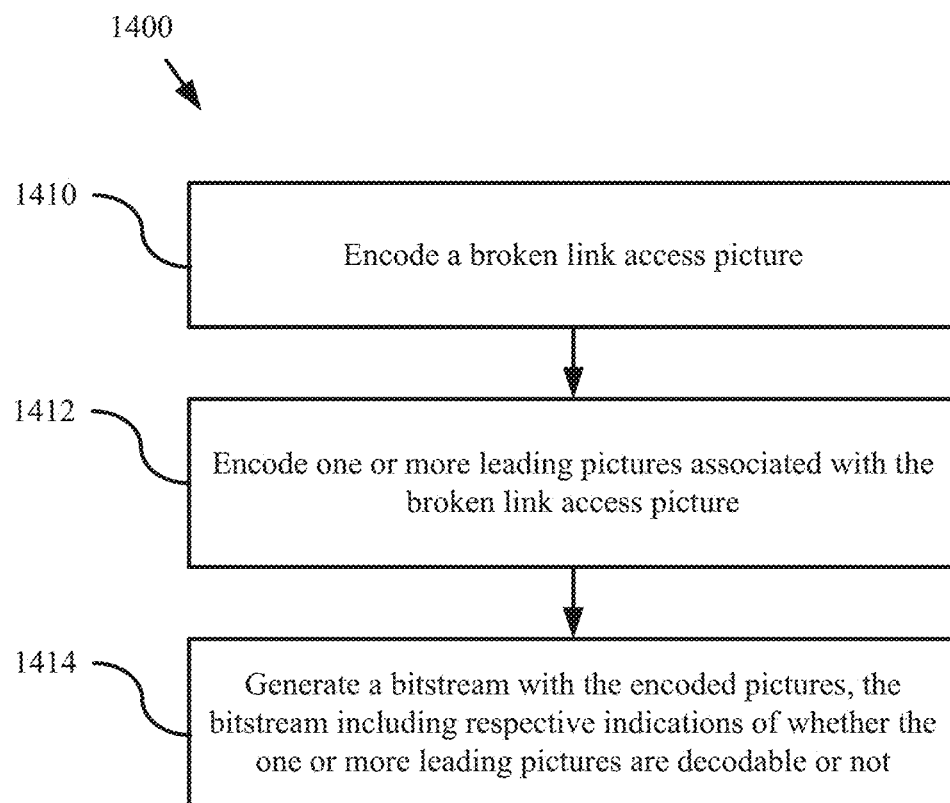
FIG. 14 is a flow chart showing a fourth exemplary method generating a bitstream.

FIG. 14 is an example method 1400 that can be performed by an encoder or digital media processing tool or device.

At 1410, a BLA picture is encoded. At 1412, one or more leading pictures associated with the BLA picture are encoded. At 1414, a bitstream is generated that comprises the encoded BLA picture and the one or more encoded associated leading pictures. Furthermore, in the illustrated embodiment, the act of generating the bitstream further comprises generating in the bitstream explicit indications for each of the one or more encoded associated leading pictures indicating whether the respective leading picture is decodable or not decodable when pictures from before the BLA picture in decoding order are unavailable to a decoder (e.g., as may occur after a splicing, fast forward, rewind, video stream changing operation, or the like). In particular implementations, the indications are NAL unit types that identify whether the respective leading picture is a RASL picture or a RADL picture.

Further, in certain implementations, the act of generating the bitstream can further comprise generating an explicit indication that the BLA picture is one of a plurality of types of BLA pictures. For example, the picture can be designated as a BLA type that may have one or more associated decodable or non-decodable leading pictures (e.g., a BLA_W_LP type).

FIG. 15 is an example method 1500 performed by a decoder or digital media processing tool or device. For example, the method can be performed to decode the bitstream generated in FIG. 14.

At 1510, a bitstream is received that comprises a BLA picture and one or more encoded leading pictures associated with the BLA picture. In the illustrated example, the bitstream further comprises explicit indications for each of the one or more encoded associated leading pictures indicating whether a respective leading picture is decodable or not decodable when pictures from before the BLA picture are unavailable to the decoder (e.g., as may occur after a splicing, fast forward, rewind, video stream changing operation, or the like). At 1512, the encoded BLA picture and the one or more encoded associated leading pictures are decoded in accordance to the explicit indications.

In some instances, the bitstream further comprises an explicit indication that the BLA picture is one of a plurality of types of BLA pictures. For example, the BLA picture can be a broken link access type that may have one or more associated decodable or non-decodable leading pictures. Further, in some examples, the explicit indications for each of the one or more encoded associated leading pictures indicate that a respective leading picture is either a decodable leading picture or a non-decodable picture when pictures from before the BLA picture in decoding order are unavailable (e.g., the leading pictures can be designated as RASL or RADL pictures).

VIII. Concluding Remarks

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored thereon computer-executable instructions for causing one or more processing units, when programmed thereby, to perform operations comprising:
    encoding a broken link access (BLA) picture, thereby generating encoded data for the BLA picture;
    outputting, as part of encoded data in a bitstream, the encoded data for the BLA picture;
    encoding a leading picture associated with the BLA picture, thereby generating encoded data for the leading picture, including generating an explicit indication for the leading picture indicating whether the leading picture is decodable or not decodable when pictures from before the BLA picture in decoding order are unavailable to a decoder; and
    outputting, as part of the encoded data in the bitstream, the encoded data for the leading picture, the encoded data for the leading picture including the explicit indication for the leading picture.

2. The one or more computer-readable media of claim 1, wherein the explicit indication for the leading picture is part of network abstraction layer ("NAL") unit type.

3. The one or more computer-readable media of claim 1, wherein the explicit indication for the leading picture indicates the leading picture is decodable when pictures from before the BLA picture in decoding order are unavailable to a decoder.

4. The one or more computer-readable media of claim 1, wherein the explicit indication for the leading picture indicates the leading picture is not decodable when pictures from before the BLA picture in decoding order are unavailable to a decoder.

5. The one or more computer-readable media of claim 1, wherein the leading picture is a first leading picture associated with the BLA picture, the operations further comprising:
    encoding a second leading picture associated with the BLA picture, thereby generating encoded data for the second leading picture, including generating an explicit indication for the second leading picture indicating whether the second leading picture is decodable or not decodable when pictures from before the BLA picture in decoding order are unavailable to a decoder; and
    outputting, as part of the encoded data in the bitstream, the encoded data for the second leading picture, the encoded data for the second leading picture including the explicit indication for the second leading picture.

6. The one or more computer-readable media of claim 1, wherein the encoding the BLA picture includes generating an explicit indication for the BLA picture indicating that the BLA picture is one of a plurality of available types of BLA pictures.

7. The one or more computer-readable media of claim 6, wherein the explicit indication for the BLA picture is part of network abstraction layer ("NAL") unit type.

8. The one or more computer-readable media of claim 6, wherein one of the plurality of available types of BLA pictures is a BLA type that may have one or more associated decodable or non-decodable leading pictures.

9. A computer system comprising one or more processing units and memory, wherein the computer system implements a video decoder configured to perform operations comprising:
    receiving, as part of encoded data in a bitstream, encoded data for a broken link access (BLA) picture;
    decoding the BLA picture;
    receiving, as part of the encoded data in the bitstream, encoded data for a leading picture associated with the BLA picture, the encoded data for the leading picture including an explicit indication for the leading picture indicating whether the leading picture is decodable or not decodable when pictures from before the BLA picture in decoding order are unavailable to a decoder; and
    decoding the leading picture in accordance with the explicit indication for the leading picture.

10. The computer system of claim 9, wherein the explicit indication for the leading picture is part of network abstraction layer ("NAL") unit type.

11. The computer system of claim 9, wherein the explicit indication for the leading picture indicates the leading picture is decodable when pictures from before the BLA picture in decoding order are unavailable to a decoder.

12. The computer system of claim 9, wherein the explicit indication for the leading picture indicates the leading picture is not decodable when pictures from before the BLA picture in decoding order are unavailable to a decoder.

13. The computer system of claim 9, wherein the leading picture is a first leading picture associated with the BLA picture, the operations further comprising:
    receiving, as part of the encoded data in the bitstream, encoded data for a second leading picture associated with the BLA picture, the encoded data for the second leading picture including an explicit indication for the second leading picture indicating whether the second leading picture is decodable or not decodable when pictures from before the BLA picture in decoding order are unavailable to a decoder; and decoding the second leading picture in accordance with the explicit indication for the second leading picture.

14. The computer system of claim 9, wherein the encoded data for the BLA picture includes an explicit indication for the BLA picture indicating that the BLA picture is one of a plurality of available types of BLA pictures.

15. The computer system of claim 14, wherein the explicit indication for the BLA picture is part of network abstraction layer ("NAL") unit type.

16. The computer system of claim 14, wherein one of the plurality of available types of BLA pictures is a BLA type that may have one or more associated decodable or non-decodable leading pictures.

17. The computer system of claim 9, wherein the decoding the leading picture in accordance with the explicit indication for the leading picture includes:

determining that the leading picture is decodable; and decoding the leading picture.

18. The computer system of claim 9, wherein the decoding the leading picture in accordance with the explicit indication for the leading picture includes:

determining that the leading picture is not decodable; and skipping the decoding the leading picture.

19. In a computer system, a method comprising:

receiving encoded data in a bitstream, the encoded data in the bitstream including encoded data for a broken link access (BLA) picture and encoded data for a leading picture associated with the BLA picture, the encoded data for the leading picture including an explicit indication for the leading picture indicating whether the leading picture is decodable or not decodable when pictures from before the BLA picture in decoding order are unavailable to a decoder; and storing, in memory or storage, the encoded data in the bitstream, the encoded data in the bitstream being organized to facilitate decoding by operations that include:

decoding the BLA picture; and decoding the leading picture in accordance with the explicit indication for the leading picture.

20. The method of claim 19, wherein the explicit indication for the leading picture is part of network abstraction layer ("NAL") unit type.

* * * * *